E. HOLMES.
DECKING SYSTEM.
APPLICATION FILED FEB. 7, 1921.
1,390,439.
Patented Sept. 13, 1921.
4 SHEETS—SHEET 1.
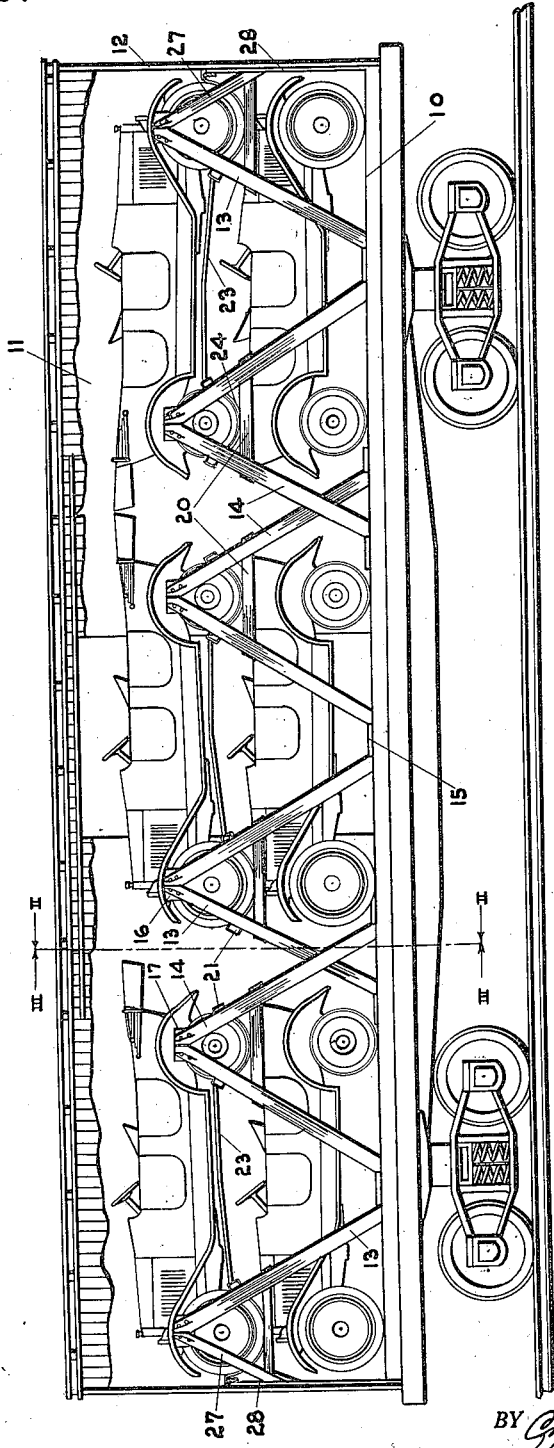
INVENTOR.
Edward Holmes.

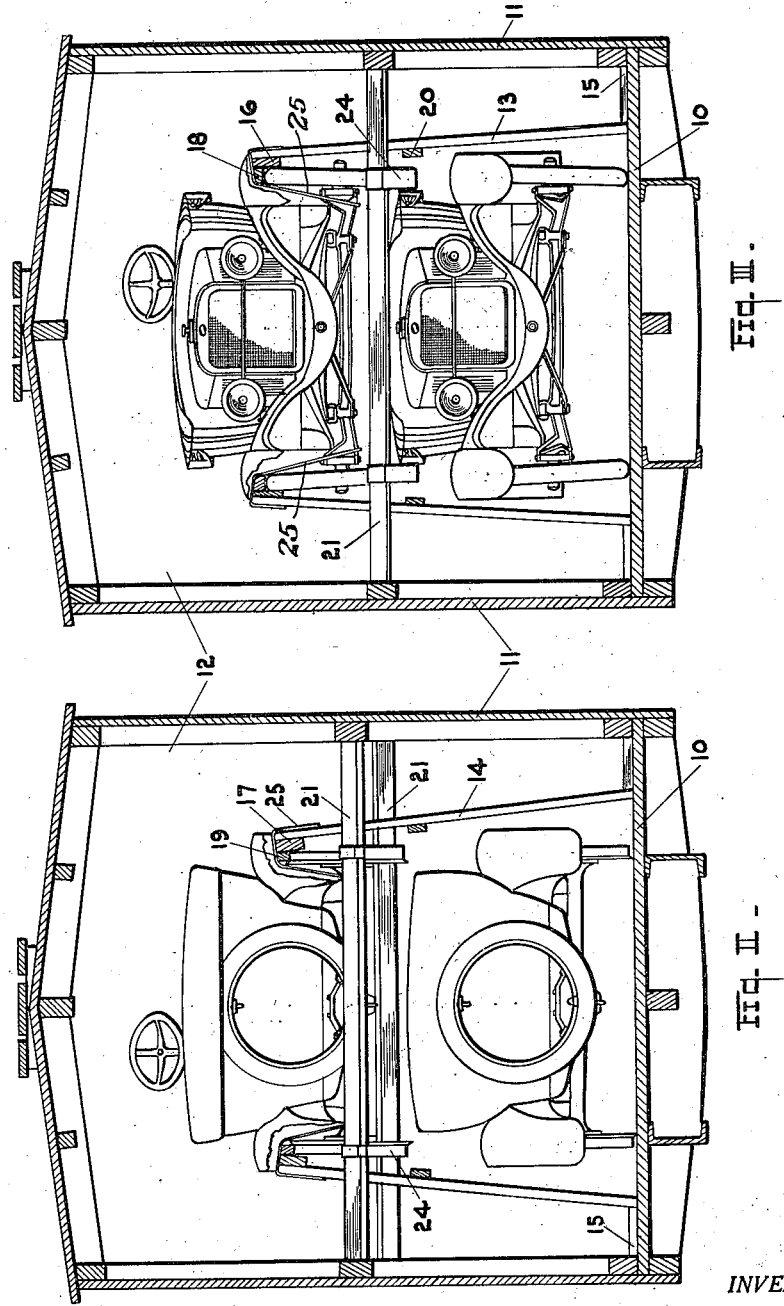

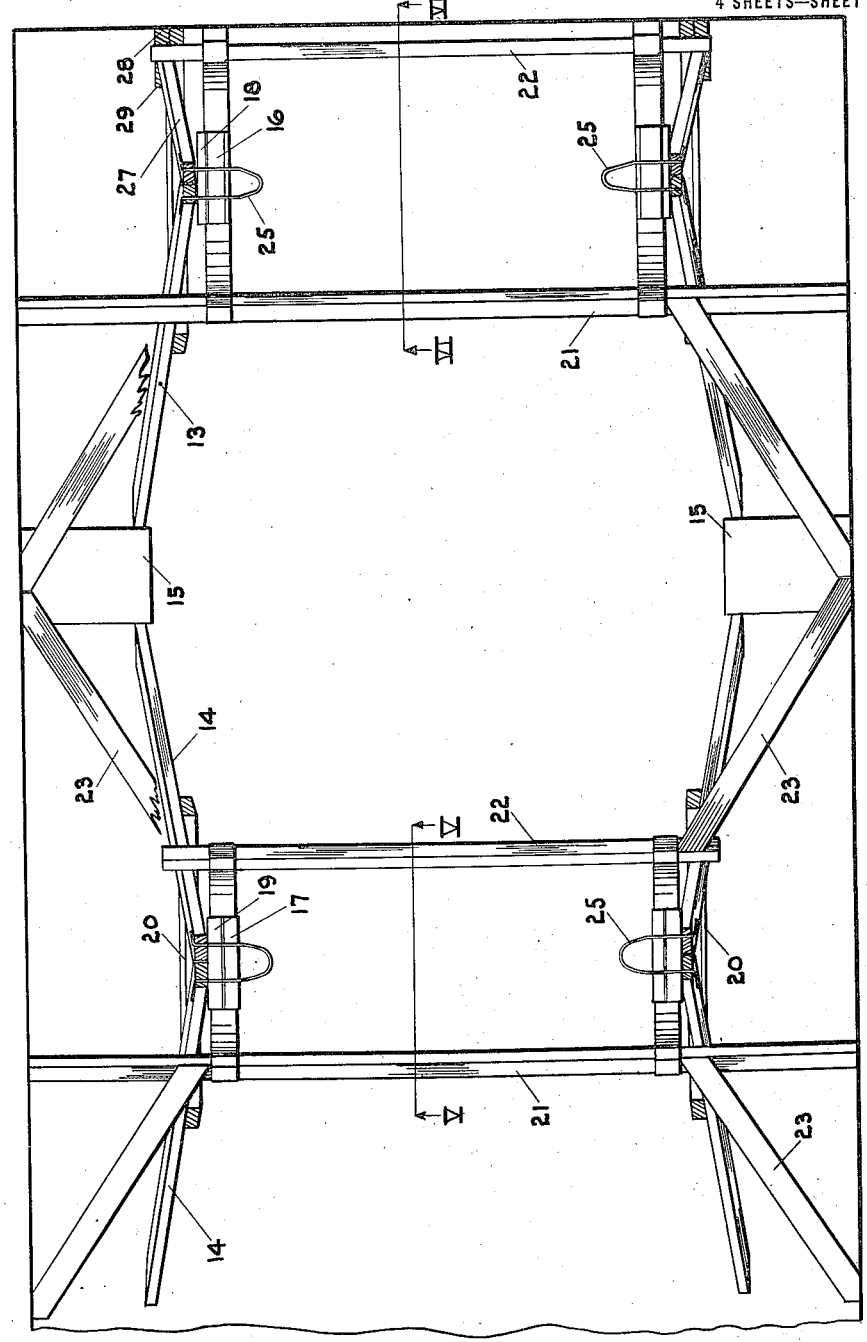

E. HOLMES.
DECKING SYSTEM.
APPLICATION FILED FEB. 7, 1921.
1,390,439.
Patented Sept. 13, 1921.
4 SHEETS—SHEET 4.
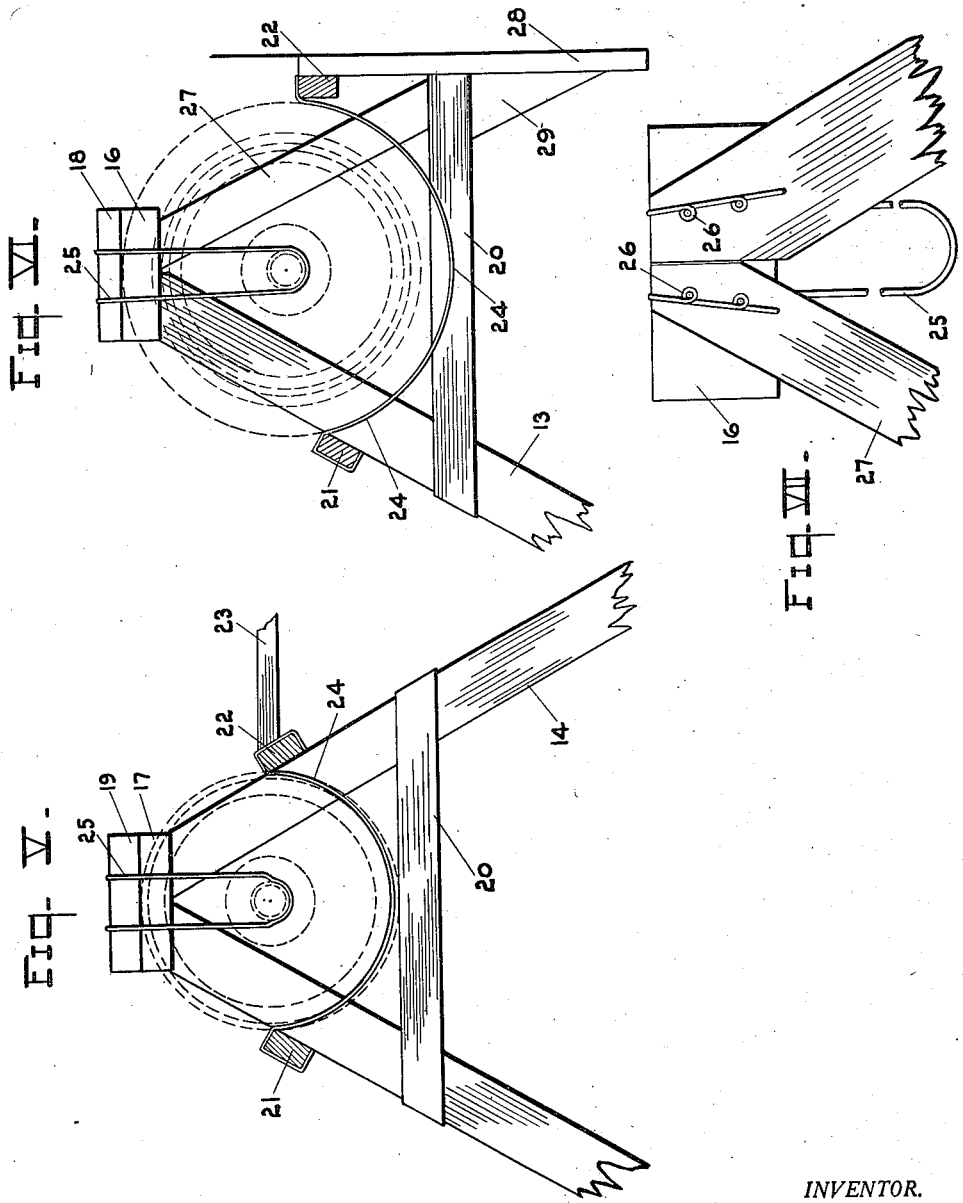
INVENTOR.
Edward Holmes.
BY
ATTORNEY.

UNITED STATES PATENT OFFICE.

EDWARD HOLMES, OF TOLEDO, OHIO, ASSIGNOR TO THE WILLYS-OVERLAND COMPANY, OF TOLEDO, OHIO, A CORPORATION OF OHIO.

DECKING SYSTEM.

1,390,439.　　　　　Specification of Letters Patent.　Patented Sept. 13, 1921.

Application filed February 7, 1921. Serial No. 443,313.

*To all whom it may concern:*

Be it known that I, EDWARD HOLMES, a citizen of the United States, residing at Toledo, county of Lucas, and State of Ohio, have invented certain new and useful Improvements in Decking Systems, of which I declare the following to be a full, clear, and exact description.

This invention relates to improvements in means for packing automobiles in freight cars.

One of the objects of the invention is the provision of means for supporting one automobile above another without removing any of the wheels of either machine.

Another object is the provision of improved means for attaching the upper automobile to its supporting frame.

Other objects, and objects relating to details of construction and economies of manufacture, will appear as I proceed with the description of that embodiment of the invention which, for the purposes of the present application, I have illustrated in the accompanying drawings, in which:

Figure I is a side elevational view of a freight car in which my invention is employed, one wall of the car being broken away to disclose the interior thereof.

Figs. II and III are transverse sections taken upon the same plane, but looking in the direction of the arrows marked II—II and III—III, respectively, of Fig. I.

Fig. IV is a plan view of an automobile support as used in one end of a car.

Fig. V is a detailed elevational view partly in section on line V—V of Fig. IV.

Fig. VI is a similar view on the line VI—VI of Fig. IV.

Fig. VII is a fragmental detail of the opposite side of the construction shown in Fig. VI.

Like reference characters refer to similar parts throughout the views.

In the drawings the numbers 10, 11 and 12 are applied to the floor, side walls and end walls respectively of a box car in which my invention is employed. For each front wheel of the upper automobile I provide a pair of legs 13 inclined toward each other at the top where they are joined together and inclined inwardly also in a lesser degree. Legs 14, shorter than the legs 13 by the radial width of a tire, are employed for the rear wheels. Preferably the lower ends of the legs are spaced from the side walls of the car by cleats 15 nailed to the floor of the car 10, the legs 13 and 14 being attached to the cleats 15 or to the floor, or both, by means of nails or the like. The joining of the upper ends of each pair of legs 13 and 14 is accomplished by blocks 16 and 17 to which the legs are nailed. These blocks are arranged on the inner side of the legs and are adapted to contact with the wheels of the automobile as shown in Figs. II and III. The blocks 16 each include a projecting part 18, which may be integral with the block itself or separate and secured thereto as shown in Fig. III. These parts 18 are of a width sufficient to extend substantially across the tops of the wheel tires. The blocks 17 for the rear wheels include similar parts 19 which, however, are somewhat narrower than the parts 18 as they are intended to extend across the rim only of the rear wheel from which the tire is removed for reasons which will be disclosed hereinafter. The legs of each pair are braced by a side member 20.

Transverse rails 21 extending entirely across the car and abutting against the opposite side walls are suitably secured, as by nailing, to the corresponding legs of oppositely arranged pairs. The other legs of each pair are joined by a rail 22 which is like the rail 21 except that it does not extend beyond the legs to which it is attached. The rails 21 brace the upper portions of the structure against side sway, but they may be assisted in this work by inclined braces 23 extending from the walls of the car to the leg assemblies and preferably nailed to the rails 21 and 22. The braces 23 are also, of course, adapted to take up some of the longitudinal thrust.

Each wheel of the automobile is supported at the bottom and part way up its side by a strap 24 preferably of metal secured at its ends to the rails 21 and 22. This strap, because of its form and function, will hereinafter be referred to as a hammock. The axles inwardly of the wheel are also supported from the leg structure and this is accomplished by means of a metallic loop 25 hereinafter called a stirrup which extends beneath the axle and up over the top of the blocks 16 and 17 and their projections 18 and 19, as the case may be, the ends of the loops being secured to the outer sides of the inclined legs. Where these loops are in the form of wires, it is convenient to fasten them to the legs by means of one or more circular bends 26 in the ends of the wire through which nails or the like may be driven. The projections 18 and 19 serve to space the loops 25 above the wheels in order to prevent damage to the latter. Each corner of the automobile is therefore supported in two different ways, and sidewise movement of the machine with respect to its supports is prevented by the blocks 16 and 17 against which the outer sides of the wheels bear.

At the ends of the freight car it is impracticable to employ inclined legs 13 because of the space that would necessarily be wasted. Consequently I have substituted short legs 27 which abut at their lower ends against uprights 28 secured to the end walls 12. The downwardly acting load delivered to the legs 27 is taken preferably by brackets 29 mounted upon the uprights 28, but it should be understood that the exact method of supporting this part of the load is immaterial so long as it is transmitted either to the floor or to the end wall of the car. At the ends of the car I prefer to secure the rail 22 to the uprights 28 rather than to the legs 27 because of the greater convenience thereby obtained in the driving of the fastenings by which the rail is held in place, as well as for the reason that this arrangement relieves the legs 27 of part of the load which they would otherwise be forced to carry.

As before stated, it is possible by the use of my invention to load automobiles one above the other in a box car without removing any of the wheels. In carrying out the invention, an automobile is run into the car until its forward extremity is adjacent to one end of the car. The tires on the rear wheels are then removed, an operation which is easily and quickly performed where demountable rims are employed. The automobile is then raised by a suitable block and tackle, and the scaffolding for that machine is built into the car, after which the block and tackle may be removed. Other means for getting the upper machine into position may be used if desired, such, for instance, as a truck with elevating mechanism thereon. It will be observed that although the axles may be at the same height clearance beneath the rear end of the automobile is greater than that beneath the front end on account of the removal of the rear tires. Another machine with its rear tires also removed may now be run into the space beneath the first. The rear axle of this machine will be lower than the front axle. Even though the front tires of the upper machine extend below the level of the top of the hood of the lower machine there will be no danger of contact because the hood will be straddled by the wheels of the upper car. This would not be the case at the rear. However, by the removal of the rear tires of both machines it will be observed that I save a vertical space equal to twice the radial width of a tire, and this is sufficient in the case of the smaller sizes of automobiles to permit the positioning of the two rear ends one above the other without any danger of contact between the top of the lower body and the wheels of the upper machine.

After two automobiles are loaded in one end of the car two other automobiles are similarly loaded in the opposite end thereof, and thereafter two others may be loaded in the middle portion of the car, this being the line of procedure ordinarily adopted. In unloading, the reverse operation is followed as will be readily understood.

While I have shown and described in considerable detail a specific embodiment of the invention, it is understood that this drawing and description is illustrative only, and for the purpose of rendering my invention clear, and that I do not regard the invention as limited to the details of construction illustrated or described nor any of them except in so far as I have included such limitations within the terms of the following claims in which it is my intention to claim all novelty inherent in my invention broadly as well as specifically.

What I claim as new and desire to secure by Letters Patent is:

1. A means for packing automobiles in freight cars comprising four supporting frames, two at each side, transverse rails supported on said frames, one in front and one in the rear of each wheel, a wheel hammock slung from each pair of rails to conform to and support the wheel, and a stirrup extending beneath the axle, the upper ends of the stirrup being secured to said frame.

2. A means for packing automobiles in freight cars comprising four supporting frames, two on each side, adapted to extend inwardly and engage the outer sides of the tops of the wheels of an automobile, transverse rails supported on said frames, one in front and one in the rear of each wheel, a wheel hammock slung from each pair of rails arranged to conform to and support a wheel, and a stirrup extending beneath the axle of the wheel, the upper ends of the stirrup being secured to said frame.

3. A means for packing automobiles in freight cars comprising four supporting frames, two on each side, an inwardly extending projection at the top of each frame having a portion adapted to overlie the top of the adjacent automobile wheel and another portion adapted to engage the outer side of the wheel, and a stirrup for each frame extending beneath the axle of the automobile inwardly of the wheel and over the top of said projection, the ends of the stirrup being anchored to the frame.

4. A means for packing automobiles in freight cars comprising four supporting frames, two on each side, an inwardly extending projection at the top of each frame having a portion adapted to overlie the top of the adjacent automobile wheel, a stirrup for each frame extending beneath the axle of the automobile inwardly of the wheel and over the top of said projection, the ends of the stirrup being anchored to the frame, and a hammock for each wheel in which the lower portion of the wheel rests, said hammock being hung from the frame.

5. A means for packing automobiles in freight cars comprising four supporting frames, two on each side, an inwardly extending projection at the top of each frame having a portion adapted to overlie the top of the adjacent automobile wheel, a stirrup for each frame extending beneath the axle of the automobile inwardly of the wheel and over the top of said projection, the ends of the stirrup being anchored to the frame, transversely extending braces secured to the frame, one in the front and one in the rear of each wheel, and a hammock hung from said braces arranged to conform to and support the wheel.

6. A means for packing automobiles in freight cars comprising four supporting frames, two on each side, an inwardly extending projection at the top of each frame having a portion adapted to overlie the top of the adjacent automobile wheel, a stirrup for each frame extending beneath the axle of the automobile inwardly of the wheel and over the top of said projection, the ends of the stirrup being anchored to the frame, transversely extending rails joining oppositely positioned frames, one in front and one in the rear of the transversely alined automobile wheels, one rail of each pair bearing at its ends against the opposite walls of the car, and hammocks hung from said rails arranged to engage beneath and support each of the wheels.

7. A means for packing automobiles in freight cars comprising four supporting frames, two on each side, an inwardly extending projection at the top of each frame having a portion adapted to overlie the top of the adjacent automobile wheel, a stirrup for each frame extending beneath the axle of the automobile inwardly of the wheel and over the top of said projection, the ends of the stirrup being anchored to the frame, one frame on each side being higher than the other and having a longer stirrup in order to accommodate a wheel with a tire in place thereon with the axle at substantially the same height as that of the other wheel.

8. The method of loading automobiles in which the hood is appreciably narrower than the wheel gage which consists in removing the tires from the rear wheels and in suspending one automobile above the other with their extremities similarly directed and with the forward axle of the upper machine at least as low as the rear axle thereof, the forward tires straddling the hood of the lower machine.

9. A means for packing automobiles in freight cars, comprising supporting frames upon opposite sides of the car, said frames having portions projecting inwardly above each wheel of the automobile, a stirrup depending from each of said projecting portions and extending beneath the axle of the wheel to support the latter, and means upon said frame for preventing lateral motion of the automobile.

10. A means for packing automobiles in freight cars, comprising supporting frames upon opposite sides of the car, said frames having portions projecting inwardly above each wheel of the automobile, a stirrup depending from each of said projecting portions and extending beneath the axle of the wheel to support the latter, and means upon said frame for preventing lateral and longitudinal motion of the automobile.

In testimony whereof I affix my signature.

EDWARD HOLMES.